United States Patent
Driever (10) Patent No.: US 10,606,663 B2
(45) Date of Patent: Mar. 31, 2020

(54) PROCESSOR MODE SWITCHING

(71) Applicant: INTERNATIONAL BUSINESS MACHINES CORPORATION, Armonk, NY (US)

(72) Inventor: Peter D. Driever, Poughkeepsie, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 242 days.

(21) Appl. No.: 15/407,762

(22) Filed: Jan. 17, 2017

(65) Prior Publication Data

US 2018/0203700 A1 Jul. 19, 2018

(51) Int. Cl.
*G06F 9/50* (2006.01)

(52) U.S. Cl.
CPC ................ *G06F 9/5083* (2013.01)

(58) Field of Classification Search
CPC .. G06F 9/30189; G06F 9/4881; G06F 9/4887; G06F 9/5044; G06F 9/505; G06F 9/5027; G06F 9/4893; G06F 9/5083
See application file for complete search history.

(56) References Cited

U.S. PATENT DOCUMENTS

| | | | | |
|---|---|---|---|---|
| 6,901,522 B2 * | 5/2005 | Buch | ............ | G06F 1/3203 713/320 |
| 8,261,285 B2 * | 9/2012 | Felter | ............ | G06F 9/5083 719/310 |
| 8,413,158 B2 * | 4/2013 | Chiang | ............ | G06F 9/5083 718/104 |
| 2005/0155032 A1 | 7/2005 | Schantz | | |
| 2006/0036878 A1 | 2/2006 | Rothman et al. | | |
| 2011/0191783 A1 | 8/2011 | Le Moal | | |
| 2016/0109921 A1 | 4/2016 | Chen et al. | | |
| 2017/0364140 A1* | 12/2017 | Banerjee | ............ | G06F 1/3296 |

* cited by examiner

*Primary Examiner* — Benjamin P Geib
(74) *Attorney, Agent, or Firm* — Cantor Colburn LLP; Steven Chiu (57) ABSTRACT

Examples of techniques for processor mode switching are disclosed. In one example implementation according to aspects of the present disclosure, a computer-implemented method for processor mode switching to cause a processing system to switch a mode of a processor of a plurality of processors, wherein each processor of the plurality of processors is one of an active processor or an inactive processor, and wherein each active processor is in one of a first mode and a second mode may include: setting a processor threshold; determining whether a number of active processors exceeds the processor threshold; and responsive to determining that the number of active processors exceeds the processor threshold, switching the mode of the processor from the first mode to the second mode.

20 Claims, 6 Drawing Sheets

PROCESSOR MODE SWITCHING

BACKGROUND

The present disclosure generally relates to data processing systems and, more particularly, relates to switching modes of a processor in a data processing system.

Computer processing systems may utilize multiple processors arranged in a parallel processor complex to process tasks in parallel. This enables the processors to execute tasks simultaneously. For example, a large task may be divided into smaller tasks which can then be executed simultaneously or concurrently by the parallel processors of the parallel processor complex. Multi-core processors may also implement parallel processing techniques to execute tasks in parallel threads.

SUMMARY

According to examples of the present disclosure, techniques including methods, systems, and/or computer program products for processor mode switching are provided. An example method for processor mode switching to cause a processing system to switch a mode of a processor of a plurality of processors, wherein each processor of the plurality of processors is one of an active processor or an inactive processor, and wherein each active processor is in one of a first mode and a second mode may include setting a processor threshold. The method may further include determining whether a number of active processors exceeds the processor threshold. The method may further include, responsive to determining that the number of active processors exceeds the processor threshold, switching the mode of the processor from the first mode to the second mode.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

In data processing systems with a few processors (e.g., 4 processors), each processor may be configured as a general purpose processor that is able to perform any suitable processing tasks for the computing system. However, as the number of processors increases (e.g., 8 processors), the processors may become inefficient. For example, if each processor is configured as a general purpose processor, the processors may be unable to efficiently manage task execution.

Various implementations are described below by referring to several examples for configuring processors using different modes to transition some processors between general purpose processors to specific purpose processors. In some data processing systems, processors may be enabled and/or disable as needed. In some cases, where a computing system only has a few processors enabled, each processor may be configured as a general purpose processor that is able to perform any suitable processing tasks for the computing system. As system demands increase, additional processors may be enabled. As the number of processors increase, the processing system may become inefficient if each processor is configured as a general purpose processor.

Example embodiments of the disclosure include or yield various technical features, technical effects, and/or improvements to technology. Example embodiments of the disclosure provide processor mode switching to cause a processor to switch between a general purpose processor mode and a dispatcher processor mode. In particular, a threshold is set, and it is determined whether a number of active processors exceeds the threshold. If the number of active processors exceeds the threshold, the processor is switched to a dispatcher processor mode, but if the number of active processors does not exceed the threshold, the dispatcher processor is switched to (or remains in) a general purpose processor mode. These aspects of the disclosure constitute technical features that yield the technical effect avoiding unproductive work while still allowing for fast task dispatching. As a result of these technical features and technical effects, a processing system in accordance with example embodiments of the disclosure represents an improvement to dispatching techniques. It should be appreciated that the above examples of technical features, technical effects, and improvements to technology of example embodiments of the disclosure are merely illustrative and not exhaustive.

Figure 1A:
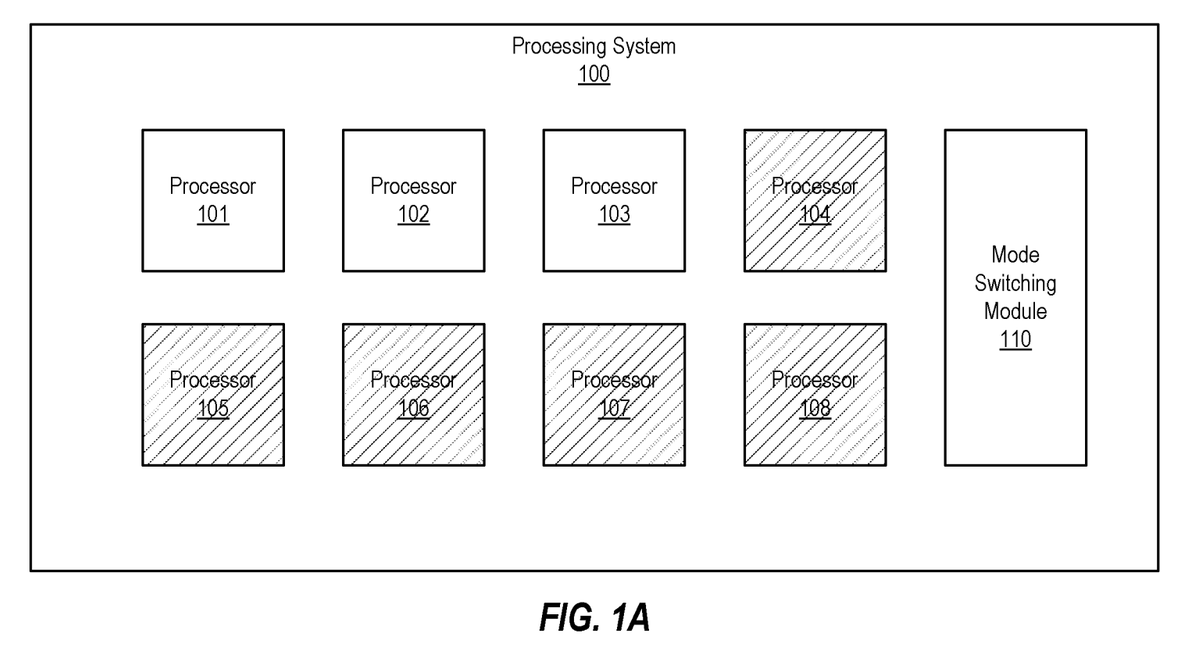
FIGS. 1A, 1B, and 1C illustrate block diagrams of processing systems for processor mode switching according to examples of the present disclosure.
Figure 1B:
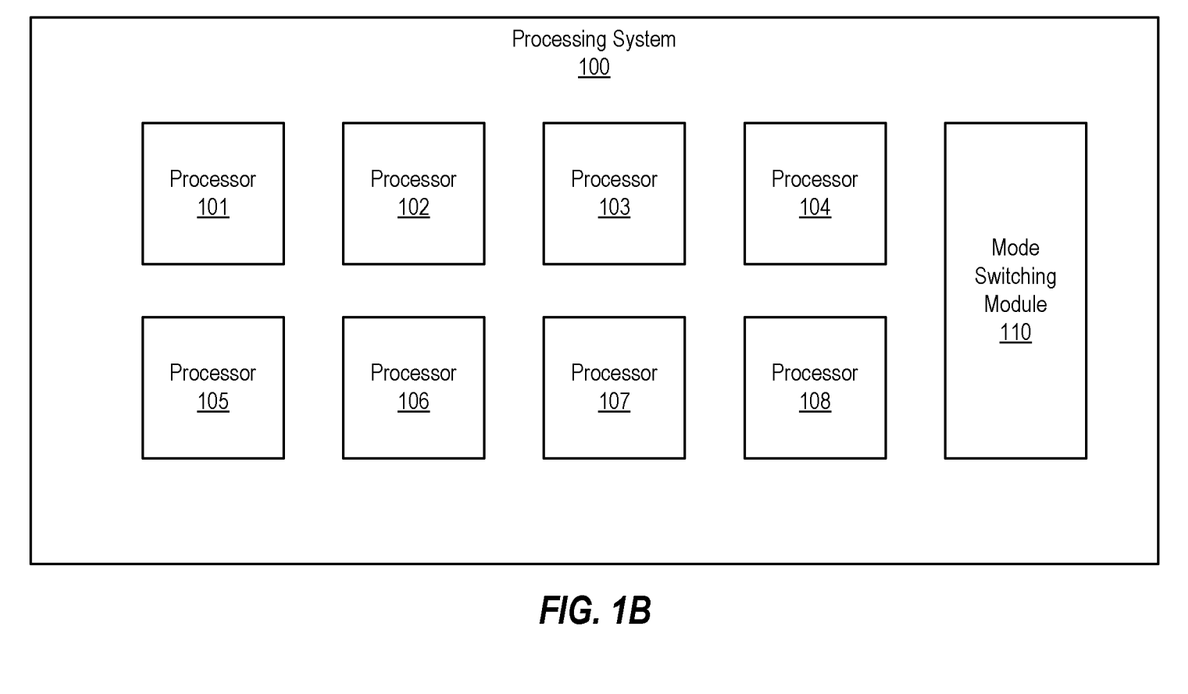
Figure 1C:
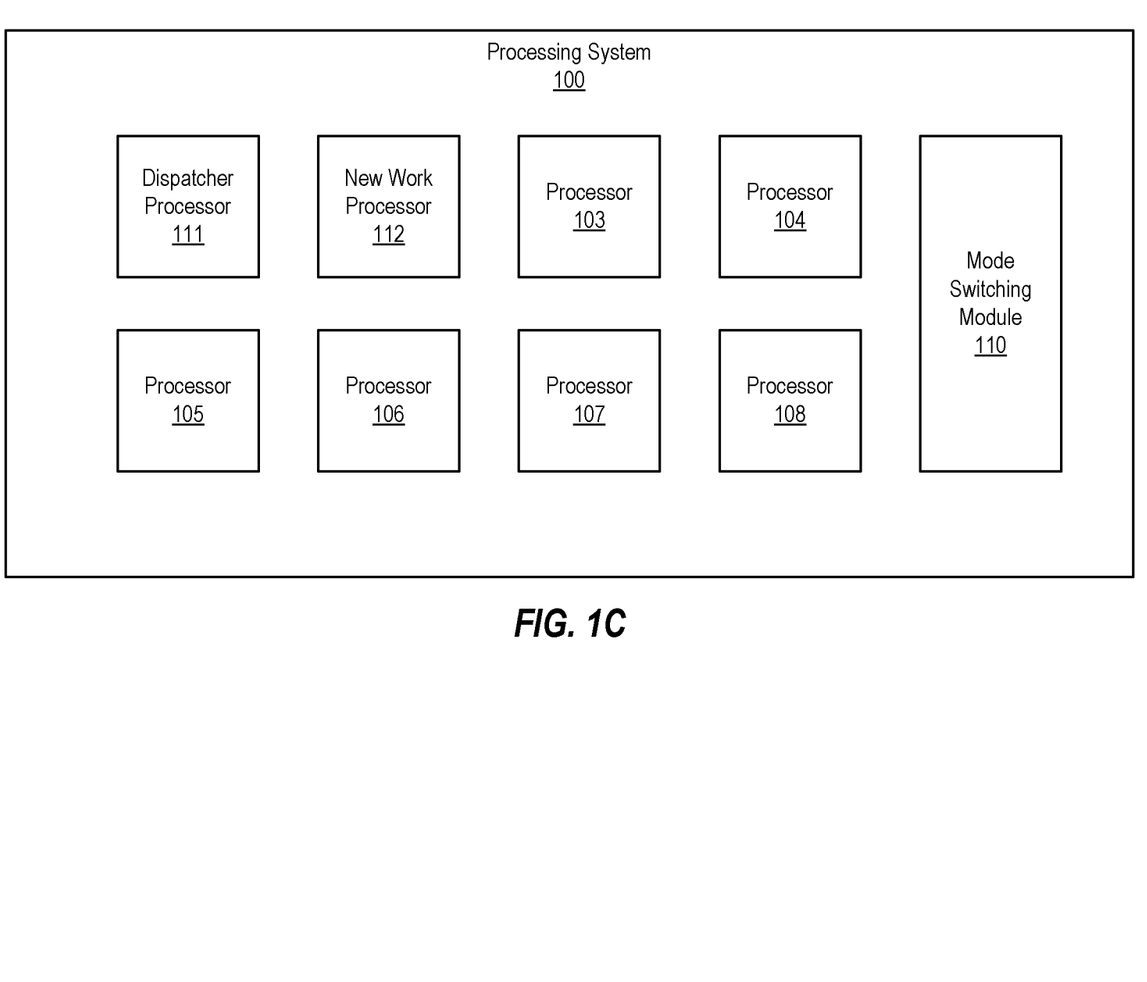

FIGS. 1A, 1B, and 1C illustrate a block diagram of a processing system 100 for processor mode switching according to examples of the present disclosure. As illustrated in FIGS. 1A, 1B, and 1C, the processing system 100 may include multiple processors, such as processor 101, processor 102, processor 103, processor 104, processor 105, processor 106, processor 107, and processor 108.

A customer may only want to access some of the processors, such as to reduce costs, in a processing system in which the customer pays for processing time of each of the processors. However, at times the customer may want to access additional of the processors. For example, at some times, the customer may only desire to access three of the eight processors of the processing system 100. In this case, as illustrated in FIG. 1A, the processors 101-103 are active and the processors 104-108 are inactive as shown by the crosshatching.

At other times, for example, the customer may desire to access other numbers of processors, such as all eight processors of the processing system. In this case, as illustrated in FIG. 1B, the processors 101-108 are all active and no processors are inactive.

Thus, in some situations, as demands on the processing system 100 increase, additional processors may be enabled. Conversely, as demands on the processing system 100 decrease, some processors may be disabled. As the number of processors increases, the processing system 100 may become inefficient if each processor is configured as a general purpose processor.

One processor from a group of processors can be designated as a dispatcher processor to dispatch work to the other processors in the group for processing. Other processors that are not the dispatching processor look for work units (tasks) that are ready to begin execution. For example, the processor 101 may be designated as a dispatcher processor (e.g., the dispatcher processor 111 of FIG. 1C), and the processors 102-108 may remain general purpose processors to process the work.

The processing system 100 can cause a processor to switch modes so that not every processor is equal (i.e., not every processor is a general purpose processor). In examples, the mode switching module 110 can switch between two different modes. In a first mode, each of the processors is a general purpose processor and can perform any tasks. In a second mode, a processor(s) is assigned specific tasks.

For example, when in the second mode, a first processor (e.g., the processor 101) is designated as a dispatcher processor 111, which is assigned to a specific task. One example of a specific task is to act to process tasks on a suspend queue and dispatch tasks from the suspend queue to a ready queue to be executed by the remaining general purpose processors (e.g., the processors 102-108). In this example, other processors (e.g., the processors 102-108) are prevented from running the suspend queue. In this way, the dispatcher processor 111 determines "who is ready to run?" in relation to tasks and other processors.

Another of the general purpose processors (e.g., the processor 102) may be assigned to bring in new work (e.g., new work processor 112). In this example, the additional remaining processors (e.g., the processors 103-108) are assigned as task processors. The task processors fetch tasks off the ready queue, separate them, and perform the work.

To determine whether to designate a processor as a dispatcher processor, the mode switching module 110 determines whether a threshold number of processors is exceeded. For example, a threshold may be set to three processors. If more than three processors are enabled, the threshold is considered to be exceeded. In another example, a threshold may be set to five, and if more than five processors are enabled, the threshold is considered to be exceeded. It should be appreciated that the threshold may be predefined, such as by a manufacturer. Additionally, the threshold may be adjustable (either up or down). For example, the threshold may be preset at three but may be adjustable (such as by the user, provider, manufacturer, etc.) to four.

The various components, modules, engines, etc. described regarding FIG. 1 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include a processing device for executing those instructions. Thus a system memory can store program instructions that when executed by a processing device (such as one or more of the processors 100-108) implement the engines described herein. Other engines may also be utilized to include other features and functionality described in other examples herein.

Alternatively or additionally, the processing system 100 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

Figure 2:
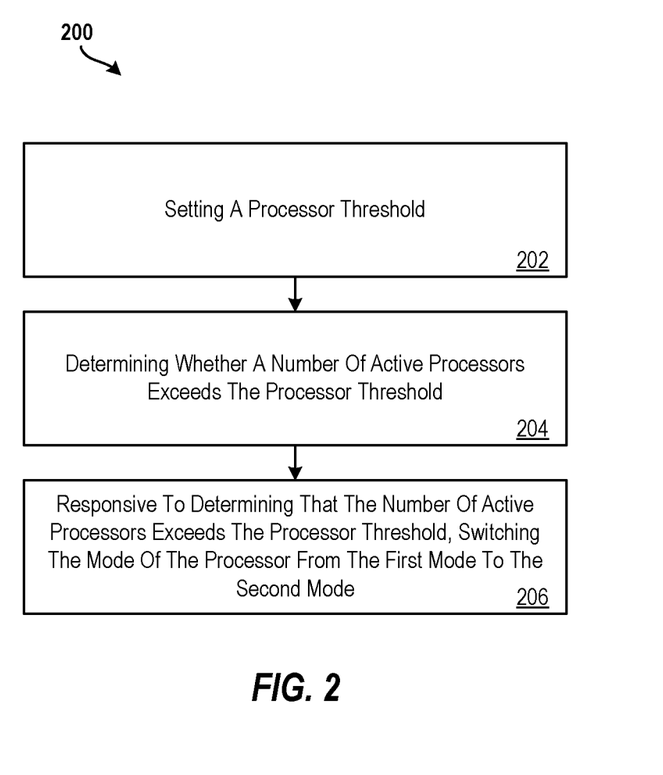
FIG. 2 illustrates a flow diagram of a method for processor mode switching according to examples of the present disclosure.

FIG. 2 illustrates a flow diagram of a method 200 for processor mode switching according to examples of the present disclosure. The method 200 may be performed, for example, by the processing system 100 of FIGS. 1A-1C, by the processing system 20 of FIG. 4, or by another suitable processing system. In particular, the method 200 causes a processing system (e.g., the processing system 100) to switch a mode of a processor (e.g., the processor 101) of a plurality of processors (e.g., the processors 101-108). Each processor of the plurality of processors is one of an active processor or an inactive processor, and each active processor is in one of a first mode and a second mode. It should be appreciated that the first mode may be a general purpose processor mode and the second mode may be a special purpose processor mode.

At block 202, the method 200 includes setting a processor threshold. The processor threshold indicates a number of processors that, when exceeded, cause the processing system to switch the mode of one of the processors from a general purpose processor to a special purpose processor, such as a dispatcher processor.

At block 204, the method 200 includes determining whether a number of active processors exceeds the processor threshold. For example, if the processor threshold is set to three processors, the processor threshold is exceeded if the number of active processors exceeds three.

At block 206, the method 200 includes switching the mode of the processor from the first mode to the second mode responsive to determining that the number of active processors exceeds the processor threshold. That is, when the processor threshold is exceeded (i.e., the number of active processors exceeds the processor threshold), the processing system 100, via the mode switching module 110, switches the mode of one of the general purpose processors to make the processor a special purpose processor.

In some examples, in the second mode the processor operates on a suspend queue. For example, the processor in the dispatcher processor mode processes tasks on a suspend queue. Additionally, in some examples, the processor in the dispatcher processor mode dispatches tasks from the suspend queue to a ready queue to be executed by the active processors of the first mode.

Additional processes also may be included, and it should be understood that the processes depicted in FIG. 2 represent illustrations, and that other processes may be added or existing processes may be removed, modified, or rearranged without departing from the scope and spirit of the present disclosure.

Figure 3:
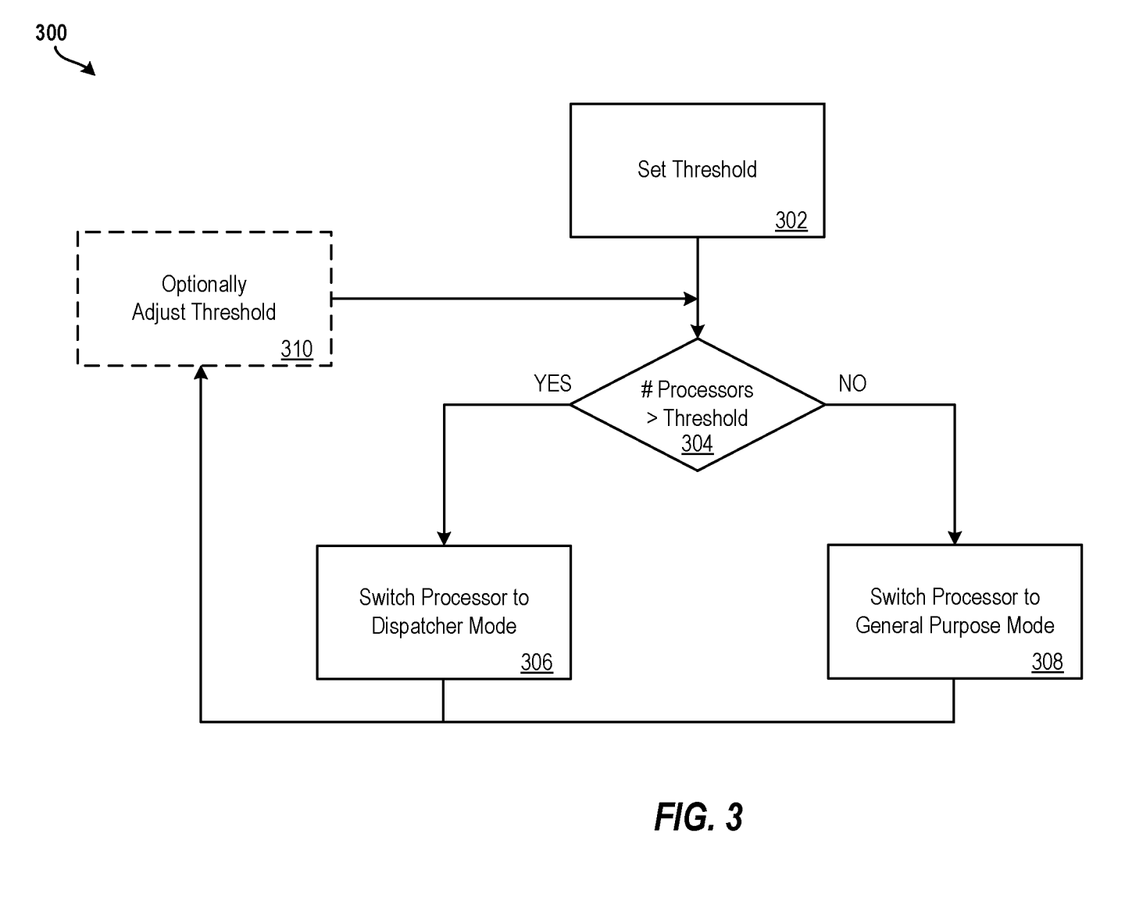
FIG. 3 illustrates a flow diagram of a method for processor mode switching according to examples of the present disclosure.

FIG. 3 illustrates a flow diagram of a method 300 for processor mode switching according to examples of the present disclosure. The method 300 may be performed, for example, by the processing system 100 of FIGS. 1A-1C, by the processing system 20 of FIG. 4, or by another suitable processing system.

At block 302, a threshold (i.e., a processor threshold) is set. For example, the threshold may be set at four active processors. At decision block 304, it is determined whether the number of active processors exceeds the threshold.

If, at decision block 304 it is determined that the number of active processors exceeds the threshold, a processor is switched to a dispatcher mode at block 306 so that the processor becomes a dispatcher processor. If, however, at decision block 304 it is determined that the number of active processors does not exceed the threshold, the processor is switched to a general purpose mode at block 308, such that the processor becomes a general purpose processor.

The method 300 may then continue back to decision block 304 for additional iterations. In this way, the number of active processors is continually monitored and a processor can be switched between the dispatcher mode and the general purpose mode based on the number of active processors.

In some examples, as illustrated at block 310, the threshold can be optionally adjusted (e.g., manually by a user, automatically by a processing system, etc.). This enables the threshold to be adjusted up or down as appropriate. The method 300 then continues to determine whether the number of processors exceeds the threshold at block 304 and proceeds with processor switching at block 306, 308.

Additional processes also may be included, and it should be understood that the processes depicted in FIG. 3 represent illustrations, and that other processes may be added or existing processes may be removed, modified, or rearranged without departing from the scope and spirit of the present disclosure.

Figure 4:
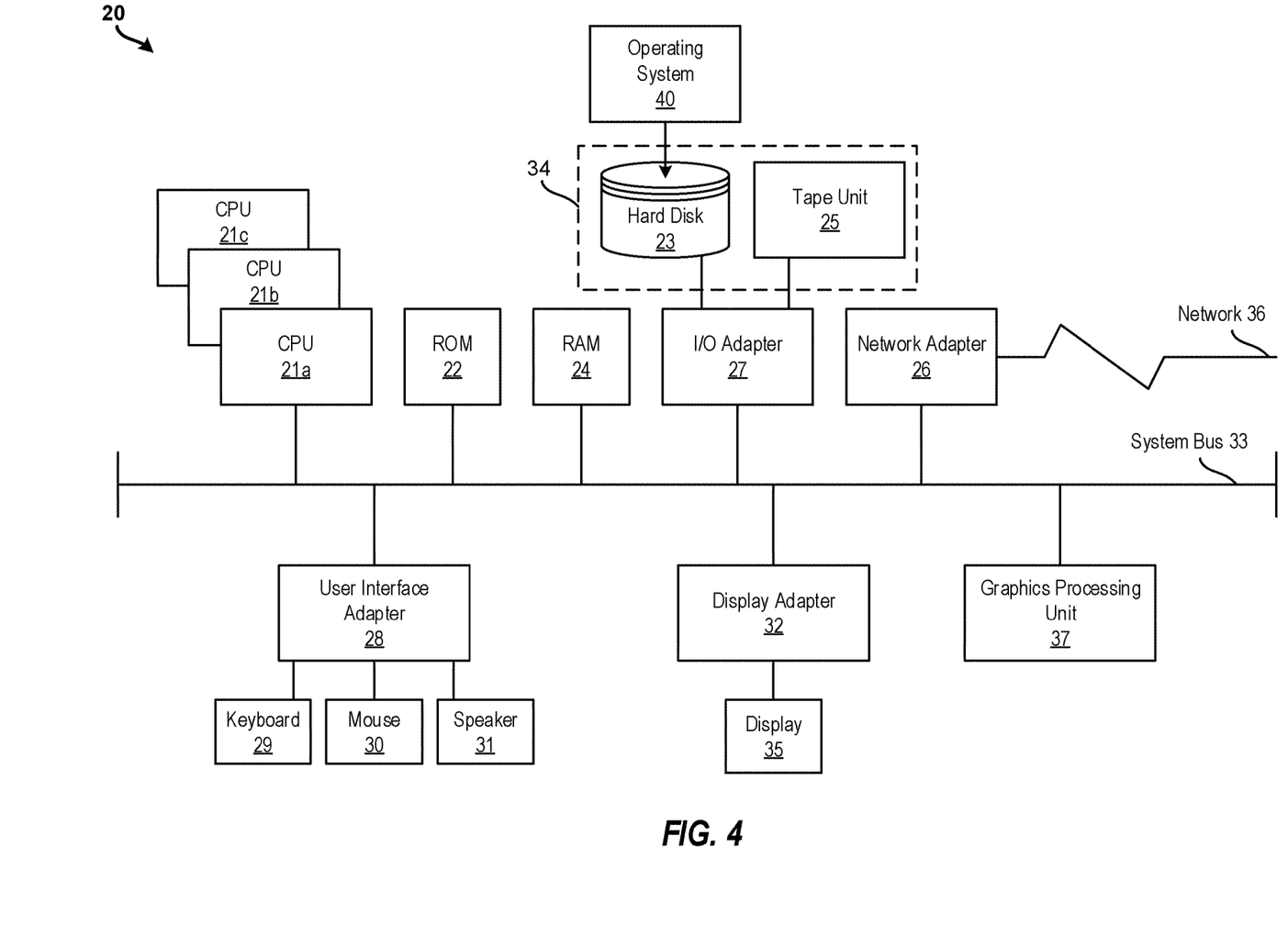
FIG. 4 illustrates a block diagram of a processing system for implementing the techniques described herein according to examples of the present disclosure.

It is understood in advance that the present disclosure is capable of being implemented in conjunction with any other type of computing environment now known or later developed. For example, FIG. 4 illustrates a block diagram of a processing system 20 for implementing the techniques described herein. In examples, processing system 20 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in processing system 20.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A computer-implemented method for processor mode switching to cause a processing system to switch an operational mode of a processor of a plurality of processors, wherein each processor of the plurality of processors is one of an active processor or an inactive processor, and wherein each active processor is in one of a first operational mode and a second operational mode, the method comprising:
    setting a processor threshold;
    determining whether a number of active processors exceeds the processor threshold; and
    responsive to determining that the number of active processors exceeds the processor threshold, switching the operational mode of the processor from the first operational mode to the second operational mode, wherein the first operational mode is a general purpose processor mode in which the processor can perform a plurality of types of tasks and the second operational mode is a special purpose processor mode in which the processor can perform only a subset of the plurality of types of tasks.

2. The computer-implemented method of claim 1, wherein when the processor is in the first operational mode, the processor functions as a general purpose processor.

3. The computer-implemented method of claim 1, wherein when the processor is in the second operational mode, the processor functions as a dispatcher processor.

4. The computer-implemented method of claim 3, wherein the processor, when functioning as the dispatcher processor, processes tasks on a suspend queue.

5. The computer-implemented method of claim 4, wherein the processor, when functioning as the dispatch processor, dispatches tasks from the suspend queue to a ready queue to be executed by the active processors of the first operational mode.

6. The computer-implemented method of claim 4, wherein the processor, when functioning as the dispatch processor, brings in new tasks and places the new tasks on a ready queue to be executed by the active processors.

7. The computer-implemented method of claim 1, further comprising, responsive to determining that the number of active processors does not exceed the processor threshold, switching the operational mode of the processor from the second operational mode to the first operational mode.

8. The computer-implemented method of claim 1, further comprising adjusting the processor threshold.

9. A system for processor mode switching to cause a processing system to switch an operational mode of a processor of a plurality of processors, wherein each processor of the plurality of processors is one of an active processor or an inactive processor, and wherein each active processor is in one of a first operational mode and a second operational mode, the system comprising:
 a memory comprising computer readable instructions; and
 a processing device for executing the computer readable instructions for performing a method, the method comprising:
  setting a processor threshold;
  determining whether a number of active processors exceeds the processor threshold; and
  responsive to determining that the number of active processors exceeds the processor threshold, switching the operational mode of the processor from the first operational mode to the second operational mode, wherein the first operational mode is a general purpose processor mode in which the processor can perform a plurality of types of tasks and the second operational mode is a special purpose processor mode in which the processor can perform only a subset of the plurality of types of tasks.

10. The system of claim 9, wherein when the processor is in the first operational mode, the processor functions as a general purpose processor.

11. The system of claim 9, wherein when the processor is in the second operational mode, the processor functions as a dispatcher processor.

12. The system of claim 11, wherein the processor, when functioning as the dispatcher processor, processes tasks on a suspend queue.

13. The system of claim 12, wherein the processor, when functioning as the dispatch processor, dispatches tasks from the suspend queue to a ready queue to be executed by the active processors of the first operational mode.

14. The system of claim 12, wherein the processor, when functioning as the dispatch processor, brings in new tasks and places the new tasks on a ready queue to be executed by the active processors.

15. The system of claim 9, the method further comprising, responsive to determining that the number of active processors does not exceed the processor threshold, switching the operational mode of the processor from the second operational mode to the first operational mode.

16. The system of claim 9, the method further comprising adjusting the processor threshold.

17. A computer program product for processor mode switching to cause a processing system to switch an operational mode of a processor of a plurality of processors, wherein each processor of the plurality of processors is one of an active processor or an inactive processor, and wherein each active processor is in one of a first operational mode and a second operational mode, the computer program product comprising:
 a computer readable storage medium having program instructions embodied therewith, the program instructions executable by a processing device to cause the processing device to perform a method comprising:
  setting a processor threshold;
  determining whether a number of active processors exceeds the processor threshold; and
  responsive to determining that the number of active processors exceeds the processor threshold, switching the operational mode of the processor from the first operational mode to the second operational mode, wherein the first operational mode is a general purpose processor mode in which the processor can perform a plurality of types of tasks and the second operational mode is a special purpose processor mode in which the processor can perform only a subset of the plurality of types of tasks.

18. The computer program product of claim 17, wherein when the processor is in the first operational mode, the processor functions as a general purpose processor.

19. The computer program product of claim 17, wherein when the processor is in the second operational mode, the processor functions as a dispatcher processor.

20. The computer program product of claim 19, wherein the processor, when functioning as the dispatcher processor, processes tasks on a suspend queue.

\* \* \* \* \*